United States Patent [19]

Nagata et al.

[11] Patent Number: 5,769,061
[45] Date of Patent: Jun. 23, 1998

[54] FUEL SUPPLY SYSTEM HAVING A SUCTION FILTER IN A SUB-TANK

[75] Inventors: Kiyoshi Nagata, Anjo; Masashi Miyamoto, Nishio; Kouji Izutani, Nagoya, all of Japan

[73] Assignee: Denso Corporation, Kariya, Japan

[21] Appl. No.: 829,541

[22] Filed: Mar. 28, 1997

[30] Foreign Application Priority Data

Apr. 1, 1996 [JP] Japan .................................. 8-078799
Apr. 1, 1996 [JP] Japan .................................. 8-078800

[51] Int. Cl.[6] .................................................. F02M 37/04
[52] U.S. Cl. .................................... 123/509; 137/572
[58] Field of Search ................................. 123/509, 497, 123/514, 516; 137/571–576

[56] References Cited

U.S. PATENT DOCUMENTS

| | | | |
|---|---|---|---|
| 4,750,522 | 6/1988 | Griffin et al. ............................ | 123/514 |
| 4,807,582 | 2/1989 | Tuckey .................................... | 123/516 |
| 4,869,225 | 9/1989 | Nagata .................................... | 123/509 |
| 4,878,518 | 11/1989 | Tuckey .................................... | 137/448 |
| 4,971,017 | 11/1990 | Beakley et al. ......................... | 123/510 |
| 5,070,849 | 12/1991 | Rich et al. .............................. | 123/509 |
| 5,186,152 | 2/1993 | Cortochiato ............................. | 123/516 |
| 5,584,988 | 12/1996 | Hashimoto et al. ..................... | 210/136 |
| 5,647,328 | 7/1997 | Fournier et al. ........................ | 123/509 |
| 5,680,847 | 10/1997 | Begley et al. ........................... | 123/509 |

FOREIGN PATENT DOCUMENTS

| | | |
|---|---|---|
| 1-34700 | 1/1989 | Japan . |
| 3-92576 | 5/1991 | Japan . |
| 7-63133 | 3/1995 | Japan . |

*Primary Examiner*—Thomas N. Moulis
*Attorney, Agent, or Firm*—Nixon & Vanderhye P.C.

[57] ABSTRACT

A fuel pump for pumping fuel is provided in a sub-tank suspended in a fuel tank in order to reserve a fuel volume necessary for the fuel pump to be started on an inlet side of the fuel pump in the fuel tank. A fuel level holding member formed so as to rise upward on a suction opening side of the fuel pump reserves the fuel in space of the risen part. Thus, a structure for reserving the fuel volume pumped by the fuel pump in the fuel tank can be obtained with a simple construction.

12 Claims, 9 Drawing Sheets

FUEL SUPPLY SYSTEM HAVING A SUCTION FILTER IN A SUB-TANK

BACKGROUND OF THE INVENTION

1. Field of the Invention

The present invention relates to a fuel supply system having a fuel pump for pumping fuel in a fuel tank.

2. Description of Related Art

It is known to supply fuel to a sub-tank in a fuel tank mounted on a vehicle as disclosed in U.S. Pat. Nos. 4,878, 518, 4,750,522, 4,971,017, and 5,070,849. According to these systems, a fuel pump for supplying fuel to an engine and a sub-tank are integrated, thereby improving mountability of the integrated fuel pump in the fuel tank. A valve for communicating the inside with outside of the sub-tank in the fuel tank is provided on the bottom of the sub-tank. The valve can be opened by a minute pressure. If there is a low volume of fuel in the fuel tank upon completion of vehicle assembly, a part of the fuel flows in the sub-tank through the valve and the fuel in the sub-tank can be pumped up by the fuel pump.

When a vehicle is parked for a long time, for example, three to four weeks, there is such a case that the fuel in the sub-tank leaks through the valve to the outside of the sub-tank. After that, when the engine is to be started, the engine cannot be started since the fuel in the sub-tank is too little.

According to Japanese Patent Laid-Open No. 7-63133, a sub-tank in a fuel tank is provided with a diaphragm valve to reserve fuel in a fuel reservoir for a long time. According to the construction in which the fuel reservoir is provided, costs are increased for the diaphragm valve. An apparatus for reserving the fuel to be pumped by the fuel pump in the fuel tank is complicated and expensive.

According to Japanese Patent Laid-Open No. 7-180632 (U.S. Pat. No. 5,584,988), a mesh filter is provided in a fuel tank. Vapor separated from fuel to be returned to the fuel tank is stored in a return fuel chamber formed in the upper part of the inside of the filter body. When the pressure in the return fuel chamber is equal to or larger than a predetermined pressure, a one-way valve is opened, the vapor is discharged from the return fuel chamber to an upper space in the tank body, and only fuel.liquid of the return fuel is pumped by the fuel pump and is supplied to the engine side. This fuel supply system has a function of eliminating the vapor in the fuel pumped by the fuel pump, however, it does not have a function of reserving the fuel on the inlet side of the pump for pumping the fuel.

Particularly, when a vehicle is parked on a slope in a state where the fuel tank has little fuel and sealing performance of the valve is unsatisfactory, the fuel is not reserved in the sub-tank. The fuel leaks from the sub-tank and stays in the corner of the fuel tank. Since the filter is not soaked in the fuel, the engine may not be started.

Even if the fuel necessary to start the engine is left in the sub-tank, when the fuel volume is low, the engine is stopped just after the engine is started or all of the fuel in the sub-tank is used before the vehicle goes out from the slope after the start of the run causing the vehicle to stop.

In order to avoid such inconveniences, it may be effective that the fuel volume which enables the vehicle to run from the slope to a flat road after the engine is started is reserved and the fuel accumulated in the corner of the fuel tank when the vehicle is parked on the slope is returned to the sub-tank when the vehicle runs on the flat road.

To reserve such a high volume of fuel, a chamber may be further provided in the sub-tank and a partition is formed between the chamber and a communicating hole for communicating the inside and outside of the sub-tank to pump fuel in the chamber. When the partition is higher than an initial fuel supply volume of fuel just after shipment from a factory, the fuel does not flow into the chamber and the fuel cannot be pumped, so that an engine cannot be started from the beginning. Consequently, the partition has to be inevitably short and cannot be an effective measure for the above inconveniences.

SUMMARY OF THE INVENTION

It is, therefore, an object of the present invention to provide a fuel supply system for assuredly reserving fuel to start an engine by fuel from a fuel pump, on a suction opening side of the fuel pump in a fuel tank.

It is another object of the present invention to provide a fuel supply system for assuredly reserving a fuel volume which can start an engine by fuel from a fuel pump, on a suction opening side of the fuel pump even if a vehicle is parked inclined.

According to the present invention, in a fuel supply system, a fuel level holding member is formed to rise on an intake opening side of a fuel pump disposed in a sub-tank so that the fuel can be accumulated in the space of a risen part. Consequently, high-volume fuel in the fuel tank necessary to start the fuel pump can be reserved with a simple construction. Thus, the fuel can be held for a long time at a high fuel level so that the fuel in the inlet side of the fuel pump in the fuel tank can be pumped.

Preferably, a passage communicating the fuel intake opening on the bottom of the sub-tank with the inside of the sub-tank is formed by a passage wall, so that even if the fuel tank is inclined, the fuel can be reserved in a space partitioned by the passage wall.

Preferably, a flange for fixing the sub-tank to a fuel tank has a return pipe through which the fuel is discharged to the fuel tank side and a sub-tank lid member has a sliding seal part which is fit into the return pipe, thereby improving sealing performance of the sub-tank.

Preferably, the return side of the fuel pump has a jet pump, and the fuel in the fuel tank can be pumped up into the sub-tank by using energy of the discharged fuel from the fuel pump.

Preferably, a spring receiving part of the flange is protruded to the opposite side of the fuel tank so that the spring is not easily deviated from the flange. Consequently, the sub-tank can be stably attached to the flange.

BRIEF DESCRIPTION OF THE DRAWINGS

Other objects, features and advantages of the present invention will become more apparent from the following detailed description when read with reference to the accompanying drawings, in which:

FIG. 2 is a view illustrating a fuel level state in the case where a fuel supply unit according to the first embodiment of the invention is inclined when a vehicle is turned or the like;

FIG. 9 is a view illustrating a fuel level state in the case where a fuel supply unit according to the fifth embodiment of the invention is inclined when a vehicle is turned or the like.

DETAILED DESCRIPTION OF PRESENTLY PREFERRED EMBODIMENTS

Figure 1:
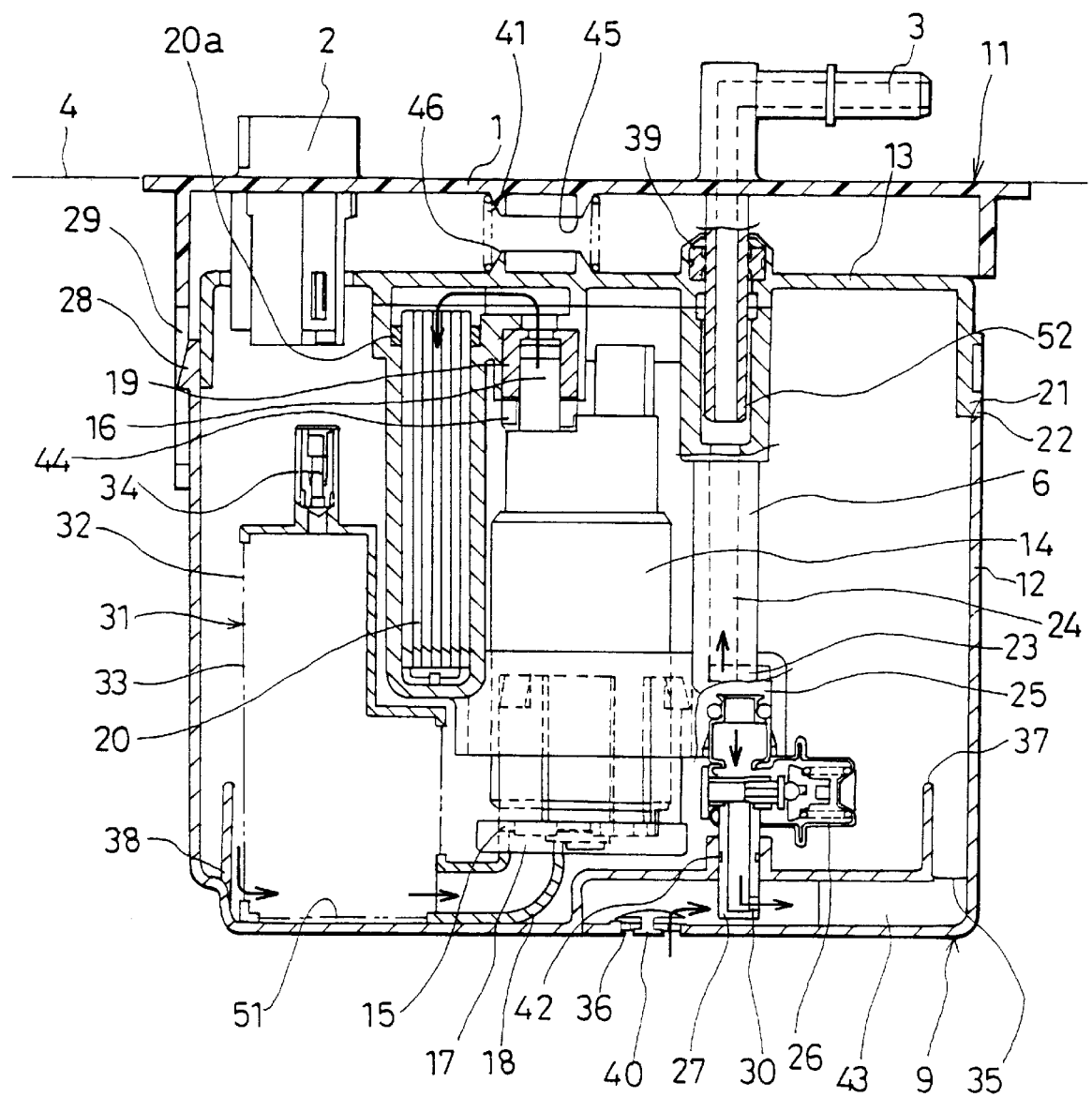
FIG. 1 is a cross sectional view showing a fuel supply system according to the first embodiment of the present invention.

Embodiments of the invention will be described hereinbelow with reference to the accompanying drawings in which same or similar parts are denoted by the same reference numerals throughout the embodiments.

First Embodiment

A fuel supply unit 11 shown in FIG. 1 is pressed from an upper tank 4 of a fuel tank (not shown) against the bottom of the fuel tank.

A flange 1 made of a resin is attached to an opening of the upper tank 4 made of metal. In the flange 1, an electric connector 2 for receiving electricity and a supply pipe 3 for supplying fuel to the engine side are formed. A sub-tank 9 is provided inside the fuel tank of the flange 1.

The sub-tank 9 is composed of a sub-tank body 12 and a sub-tank lid member 13 for covering the upper opening of the sub-tank body 12. The sub-tank lid member 13 has a filter housing 6 in the inside of the sub-tank 9.

A fuel pump 14 is provided on the center of the filter housing 6. A bracket 17 is attached to a suction opening 15 of the fuel pump 14 and a suction pipe 18 is extended in an L shape from the bracket 17. A discharge opening 16 of the fuel pump 14 is connected via a seal ring 19 to the filter housing 6. In the filter housing 6, a filter element 20 is housed in a semicylindrical shape on a part of the outer periphery of the fuel pump 14. The filter element 20 is fixed to the filter housing 6 by an adhesive 20a. A snap fit nail 21 of the sub-tank lid member 13 is elastically fit into a fit hole 22 of the sub-tank body 12. The fuel passed from the fuel pump 14 through the filter element 20 is dristributed at a branched part 23 of the filter housing 6 into a supply passage 24 to be supplied to the engine supply side and a return passage 25 to be returned into the sub-tank 9. A pressure regulator 26 is attached to the return passage 25 side. A nozzle 27 is attached to the outlet of the pressure regulator 26. A snap fit nail 28 of the sub-tank body 12 is elastically fit into a fit hole 29 of the flange 1.

A plurality of main parts of the fuel supply unit 11 of the invention will be described in detail hereinbelow.

(1) Suction filter

In a suction filter 31, a fuel level holding member 32 is formed in a shape such that a vessel is vertically risen on the inlet side of the suction pipe 18 of the fuel pump 14. The fuel level holding member 32 has a fuel oil film forming filter 33 having openings each of which is about 30 to 50 μm on the inlet side of the suction pipe 18. A check valve 34 is provided on oil film forming filter 33. The bottom 51 of the oil film forming filter 33 is positioned lower than a labyrinth wall passage bottom 35 which will be described later.

Figure 3A:
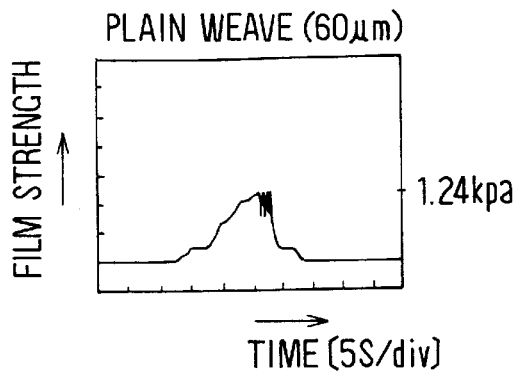
FIGS. 3A–3F are graphs illustrating the results of an experiment on film strength of a suction filter.
Figure 3D:
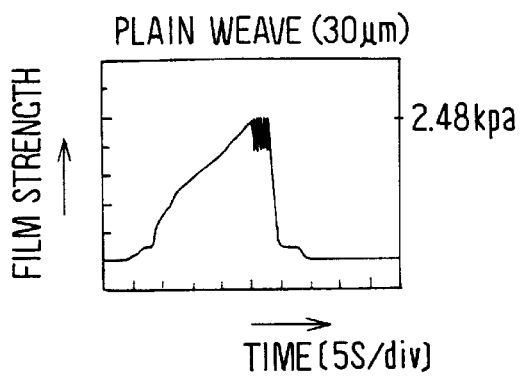
Figure 3B:
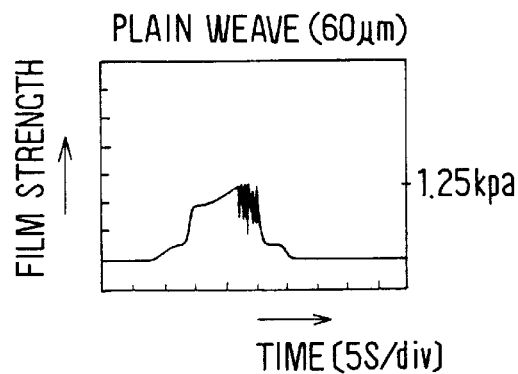
Figure 3E:
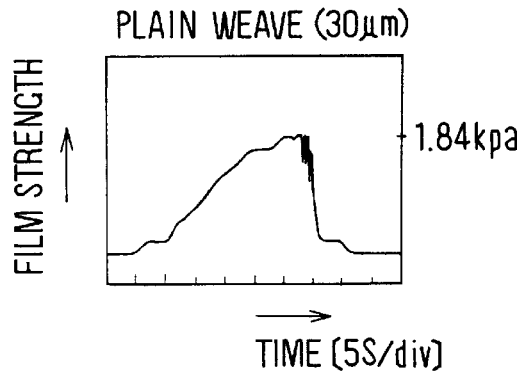
Figure 3C:
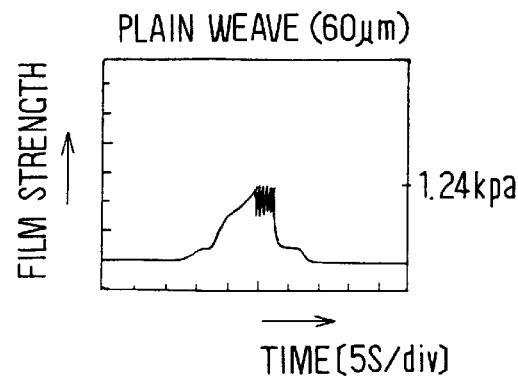
Figure 3F:
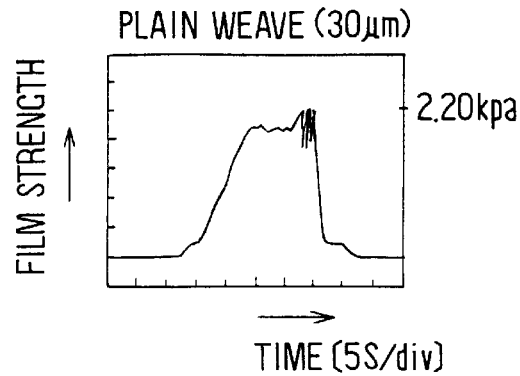

The suction filter 31 has a rising shape to be filled with fuel of about 100 to 300 cc. Consequently, the fuel filled in the suction filter 31 can be pumped up via the suction pipe 18 by the fuel pump 14. Experiment on film strength of the suction filter 14 was carried out with respect to materials of the filter of plain weave in which each opening is 60 μm (FIGS. 3A–3C) and that in which each opening is 30 μm (FIGS. 3D–3F). The results shown in FIGS. 3A–3F show that the suction filter having 30 μm openings has a higher oil film strength. The following kinds of the mesh of the suction filter may be used: (1) plain weave (opening of 30 μm), (2) twill weave (opening of 30 μm), (3) plain weave (opening of 30 μm)+folding weave (opening of 100 μm), and (4) twill weave (30 μm)+folding weave (100 μm). In (3) and (4) which are a double-layer mesh type, the life is not deteriorated by clogging and the surface area itself of the suction filter 31 can be reduced.

(2) Labyrinth structure

Figure 2:
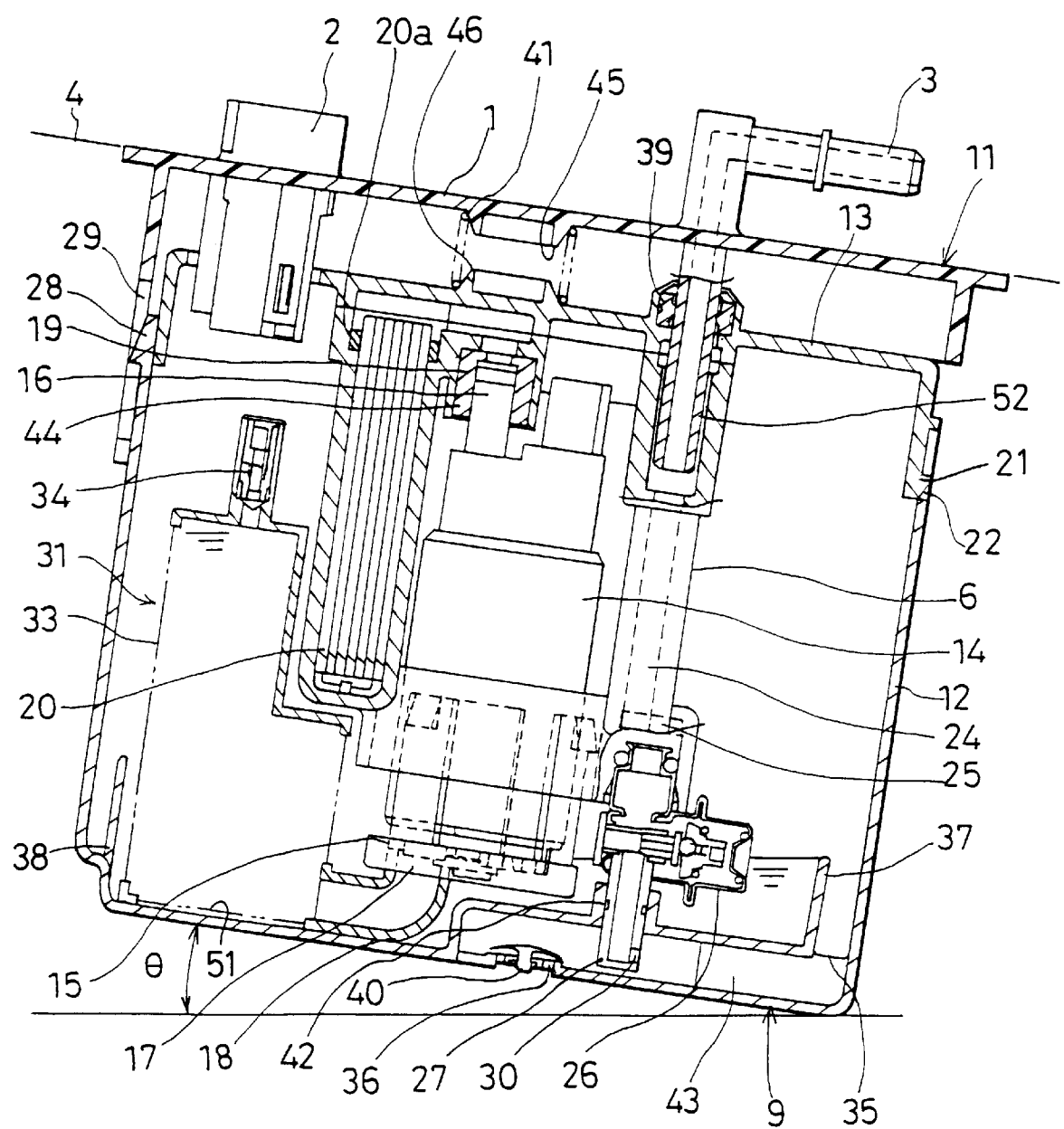
Figure 7:
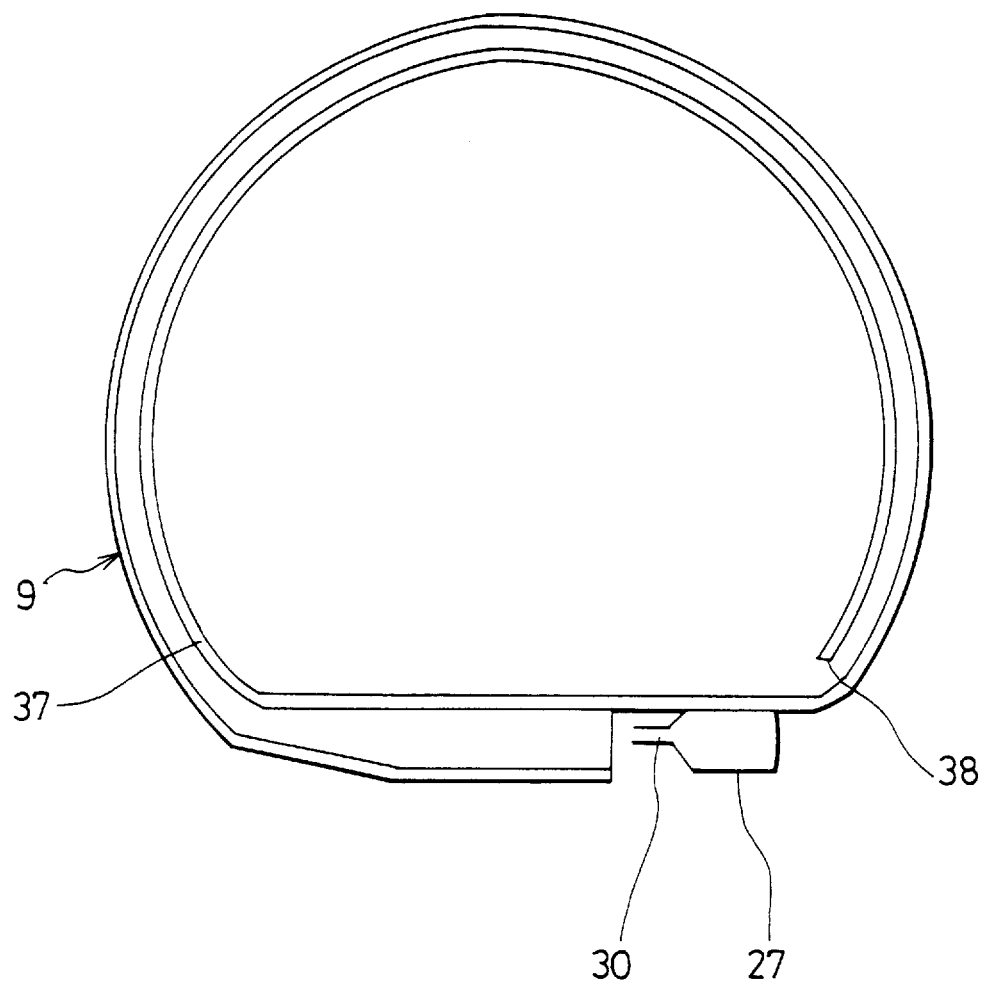
FIG. 7 is a top plan view of a sub-tank body used in the first embodiment of the present invention.

The labyrinth structure is formed on the bottom of the sub-tank 9 as shown in FIG. 7 so that the fuel taken in the sub-tank 9 from a fuel intake port 36 formed on the bottom of the sub-tank 9 is not released when the fuel level is inclined. The labyrinth structure includes the intake port 36, a throat part 43, the labyrinth wall bottom 35, a labyrinth wall 37 formed in a semicircular shape, and a labyrinth wall end 38. With the labyrinth structure, as shown in FIG. 2, even when the fuel supply unit 11 is inclined, the fuel in the labyrinth wall 37 can be sucked from the suction opening 15 of the fuel pump 14.

(3) Sliding seal

An annular sliding seal member 39 attached to the sub-tank lid member 13 is attached to the outer periphery of a pipe 52 protruding toward the inside of the supply pipe 3 of the flange 1 so as to be slidable in the longitudinal direction of the pipe 3.

(4) Jet pump

The nozzle 27 of the jet pump is integrally provided in the sub-tank 9 via an O-ring 42. The inner diameter of the nozzle 27 is set within a range from 1.0 to 3.6 mm. The inner diameter of the throat part 43 of the jet pump is set within a range from 4 to 13 mm. A check valve 40 attached to the fuel intake port 36 of the sub-tank 9 has an umbrella shape and is made of FKM or fluorosilicone.

The fuel intake port 36 formed on the bottom of the sub-tank 9 has the valve 40 and the fuel is sucked from the outside of the sub-tank 9 to the inside of the sub-tank 9 through the fuel intake port 36 by a negative pressure generated by the jet of the return fuel discharged from eject holes 30 of the nozzle 27. Consequently, the fuel can be sucked from the outside of the sub-tank 9 in the fuel tank to the inside by the jet of the return fuel. Thus, when the fuel pump 14 is driven, the sub-tank 9 is always filled with a necessary volume of the fuel to be sucked by the fuel pump 14.

(5) Spring receiving part

The sub-tank lid member 13 is urged downward by a compression coil spring 41 for the flange 1. The sub-tank 9 is always consequently pressed against the bottom of the tank, thereby reducing an unavailable remaining volume and positioning the sub-tank 9 in the fuel tank. The sub-tank 9 is prevented from being rattled for the flange 1. The spring receiving part has convexed parts 45 and 46 so as to hold the spring 41 in the spring axial direction and to stably attach the spring 41.

FKM, H-NBR, fluorosilicone, or the like is used for the seal ring 19 and a sliding seal 44. It is desirable to use POM including carbon or POM for the sub-tank 9. The convex part 45 for holding one end of the compression coil spring 41 is formed on the under face of the flange 1. The convex part 46 for holding the other end of the compression coil spring 41 is provided on the top of the sub-tank lid member 13.

In operation, when the fuel pump 14 is driven, the fuel ejected from the discharge opening 16 of the fuel pump 14 passes through the filter element 20 and is distributed by the branch 23 into fuel supplied to the engine side and fuel to be returned to the fuel tank via the pressure regulator 26. The fuel to be supplied to the engine passes through the passage in the supply pipe 3 from the supply passage 24 to the engine. The return fuel flowing to the pressure regulator 26 side is ejected from the eject holes 30 of the nozzle 27. In this instance, the fuel is sucked via the fuel intake port 36 from the outside of the sub-tank 9 by the fuel sucking action by the negative pressure caused by the jet flow, and is sucked from the throat part 43 to the inside of the sub-tank 9. The fuel sucked into the sub-tank 9 enters the suction filter 31, passes through the suction pipe 18, the suction opening 15, and the fuel pump 14 and is ejected from the discharge opening 16.

Upon completion of assembly of the vehicle having the fuel supply system, fuel for the initial run, for example, by about 6 to 10 liters is supplied to the fuel tank. The fuel level in the fuel tank must be higher than the position of the labyrinth wall passage bottom 35 and the valve 40 is set to open by a slight pressure difference between the inside and outside of the sub-tank 9. Since the level of the fuel is higher than the labyrinth wall passage bottom 35, the fuel passes from the fuel intake port 36 through the throat part 43 and the labyrinth wall 37 and flows from the labyrinth wall end 38 to the bottom 51 of the suction filter 31 in the sub-tank 9. When the suction pipe 18 of the suction filter 31 is filled with the fuel, the fuel pump 14 can suck and eject the fuel and sends the fuel under pressure.

At the time of an ordinary run, the fuel passes from the discharge opening 16 through the filter element 20 and is distributed by the branch 23 of the filter housing 6 into the engine side passage and the return side passage. The fuel flowing to the engine side is supplied through the supply pipe 3 to the engine. The fuel flowing to the return side is pressure regulated by the pressure regulator 26 and flows into the nozzle 27. The fuel ejected from the ejection hole 30 of the nozzle 26 becomes a jet and flows into the throat part 43. The pressure energy is changed by the fluid energy conversion to the flow energy, and the fuel outside of the sub-tank 9 is sucked into the sub-tank 9. Consequently, the liquid level in the sub-tank 9 is raised in respect to the level of the outside of the sub-tank 9 and the sub-tank 9 is filled with the fuel. At the time of the ordinary run, since the return flow is sufficient for the volume consumed by the engine, even if the fuel on the outside of the sub-tank 9 is used up, the fuel can be stably supplied by the fuel accumulated in the sub-tank 9 without causing engine instability when the vehicle turns.

When the vehicle is left on a slope for a long time with the bottom 51 being inclined by an angle θ as shown in FIG. 2, as long as the openings of the suction filter 31 are fine (30 μm) enough as discussed with reference to FIGS. 3A–3F to have a sufficient film strength, a state in which the fuel is collected up to the upper part of the suction filter 31 in the sub-tank 9 can be kept for a long time and the fuel of 100 to 300 cc can be reserved. That is, with respect to the assurance of the fuel of about 100 to 300 cc when the vehicle is left on a slope for a long time, since the sub-tank 9 is filled with the fuel by the above operation, the suction filter 31 is also filled with the fuel by the difference of the pressure heads. Air collected in the suction filter 31 is discharged from the check valve 34.

Even if the fuel leaks from the check valve 40 to the outside of the sub-tank 9 when the vehicle is parked, since the openings of the suction filter 31 are fine as shown in FIG. 3, the sub-tank 9 is sealed by the film strength and the fuel in the suction filter 31 can be maintained for a long time.

According to the embodiment, since the sub-tank 9 can be sealed by using a natural phenomenon of the oil film as mentioned above, the fuel reserving function can be achieved at low costs. The labyrinth-shaped wall is provided on the bottom of the suction filter 31 and the fuel always exists on the bottom 51 of the suction filter 31, so that breakage of the oil film is prevented by the surface tension. Further, under the conditions, when vapor is generated in the suction filter 31, the vapor escapes from the check valve 34 to the outside.

According to the embodiment, since the sliding seal 39 is used, the change in position of the sub-tank 9 in the fuel tank can be optionally adjusted according to the height of the fuel tank. Especially with respect to a recent short fuel tank, the sub-tank 9 can be easily attached without using a hose by such a compact structure.

In the embodiment, by providing the sliding seal 39, the change in the tank height of about 30 to 40 mm can be also followed even in a short fuel tank of, for example, about 160 mm. Further, according to the embodiment, since the thickness of the sliding seal 39 is increased and sliding resistance is suppressed to about 2 kgf, there is an effect that vibration of the fuel pump 14 is attenuated and vibration of the flange 1, which is a cause of noises in the vehicle compartment, can be consequently reduced. The fuel pressure is applied to separate the flange 1 and the sub-tank 9, so that a force helping the compression coil spring 41 can be obtained.

Second Embodiment

Figure 4:
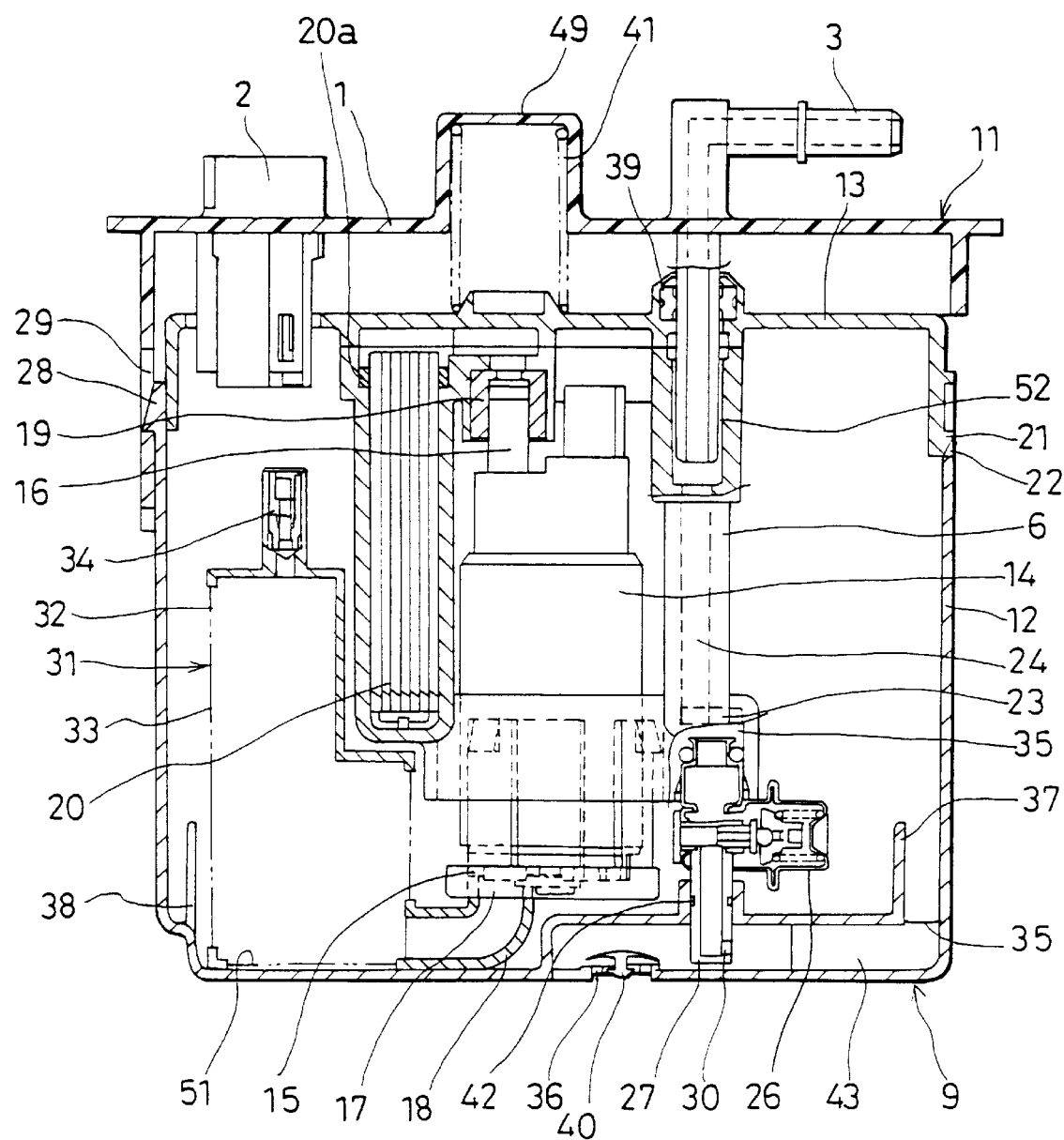
FIG. 4 is a cross sectional view showing a fuel supply system according to the second embodiment of the present invention.

In the second embodiment shown in FIG. 4, a spring guide part 49 formed on the flange 1 is convexed upward. Since the full length of the compression coil spring 41 can be set longer, a follow range in the tank height direction of the fuel supply unit 11 is large.

Third Embodiment

Figure 5:
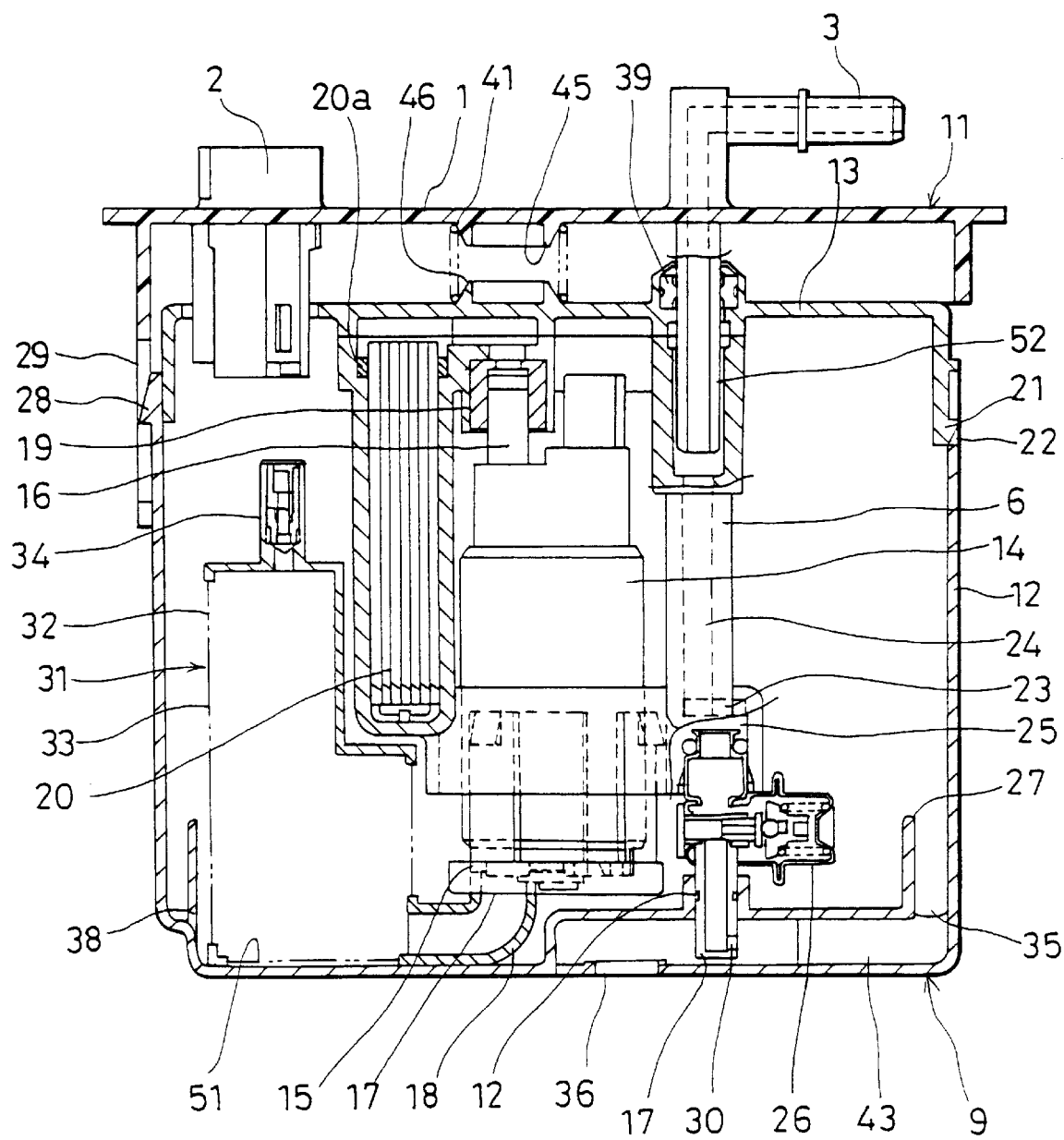
FIG. 5 is a cross sectional view showing a fuel supply system according to the third embodiment of the present invention.

In the third embodiment shown in FIG. 5, the fuel intake port 36 has no check valve. This embodiment is effective for a fuel supply system having a specification which dispenses with reserving the fuel for several days. That is, the check valve is not used and only fuel required in the case that the vehicle is left for a long time, for example, three to four weeks, can be reserved. The costs can be accordingly reduced.

Fourth Embodiment

Figure 6:
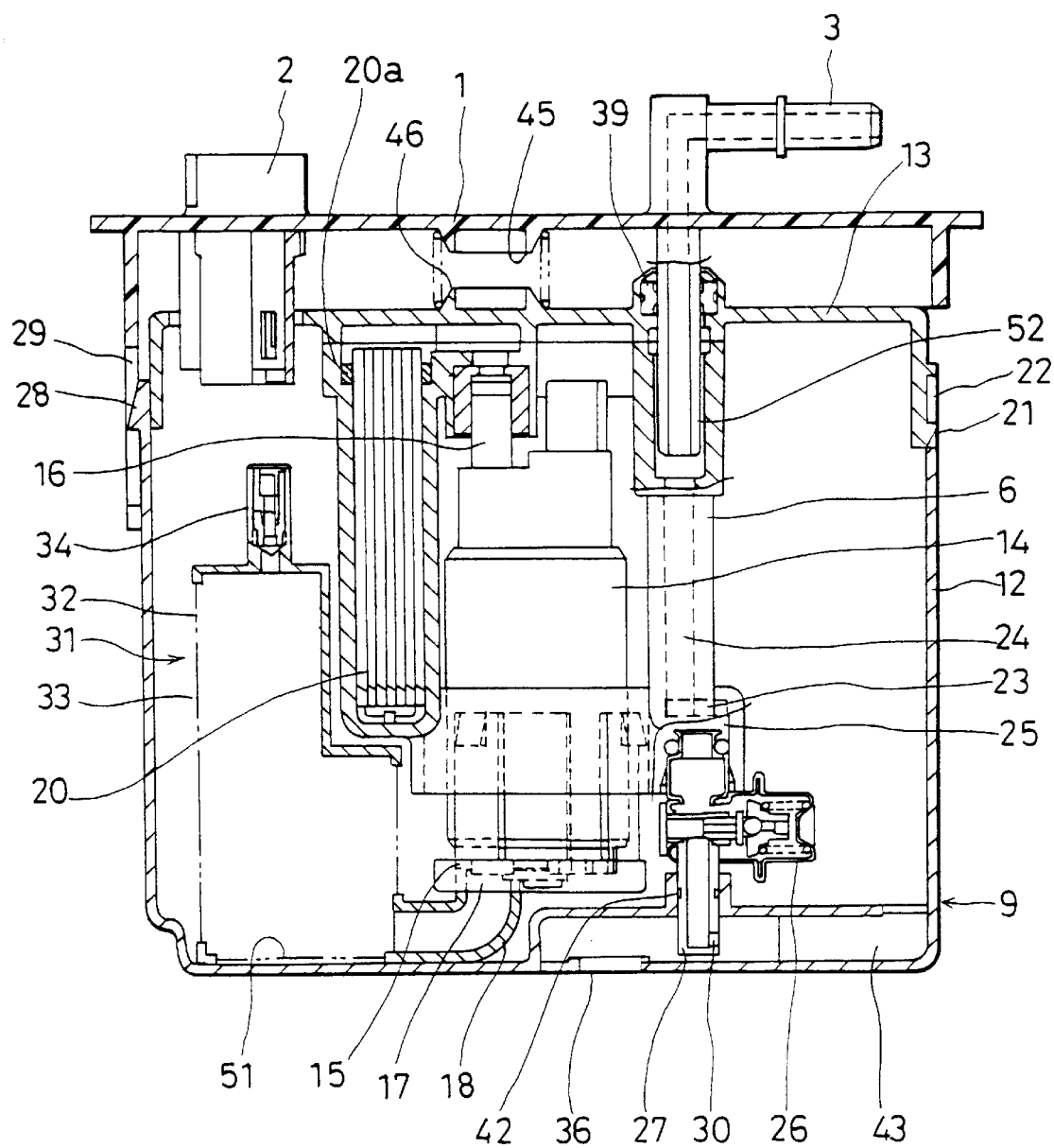
FIG. 6 is a cross sectional view showing a fuel supply system according to the fourth embodiment of the present invention.

In the embodiment shown in FIG. 6, the labyrinth wall structure (FIG. 7) and the check valve 40 in the first embodiment shown in FIG. 1 are omitted. Since the labyrinth wall 37 and 38 is not provided in the sub-tank 9, the structure of the sub-tank 9 is simplified, and the costs can be reduced. The suction filter 31 and other elements operates in the same manner as in the embodiment of FIG. 1.

Fifth Embodiment

Figure 8:
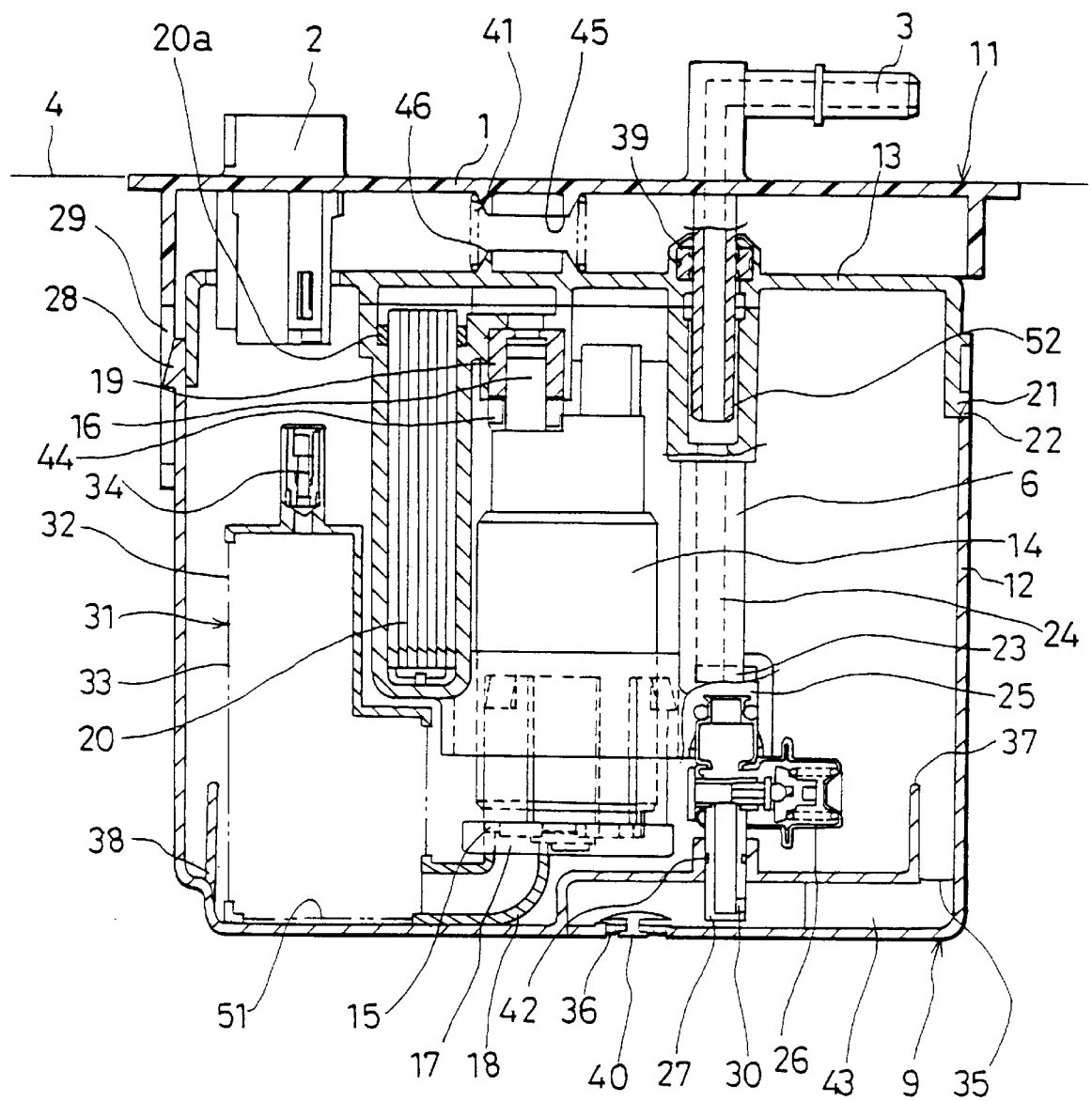
FIG. 8 is a cross sectional view showing a fuel supply system according to the fifth embodiment of the present invention.
Figure 9:
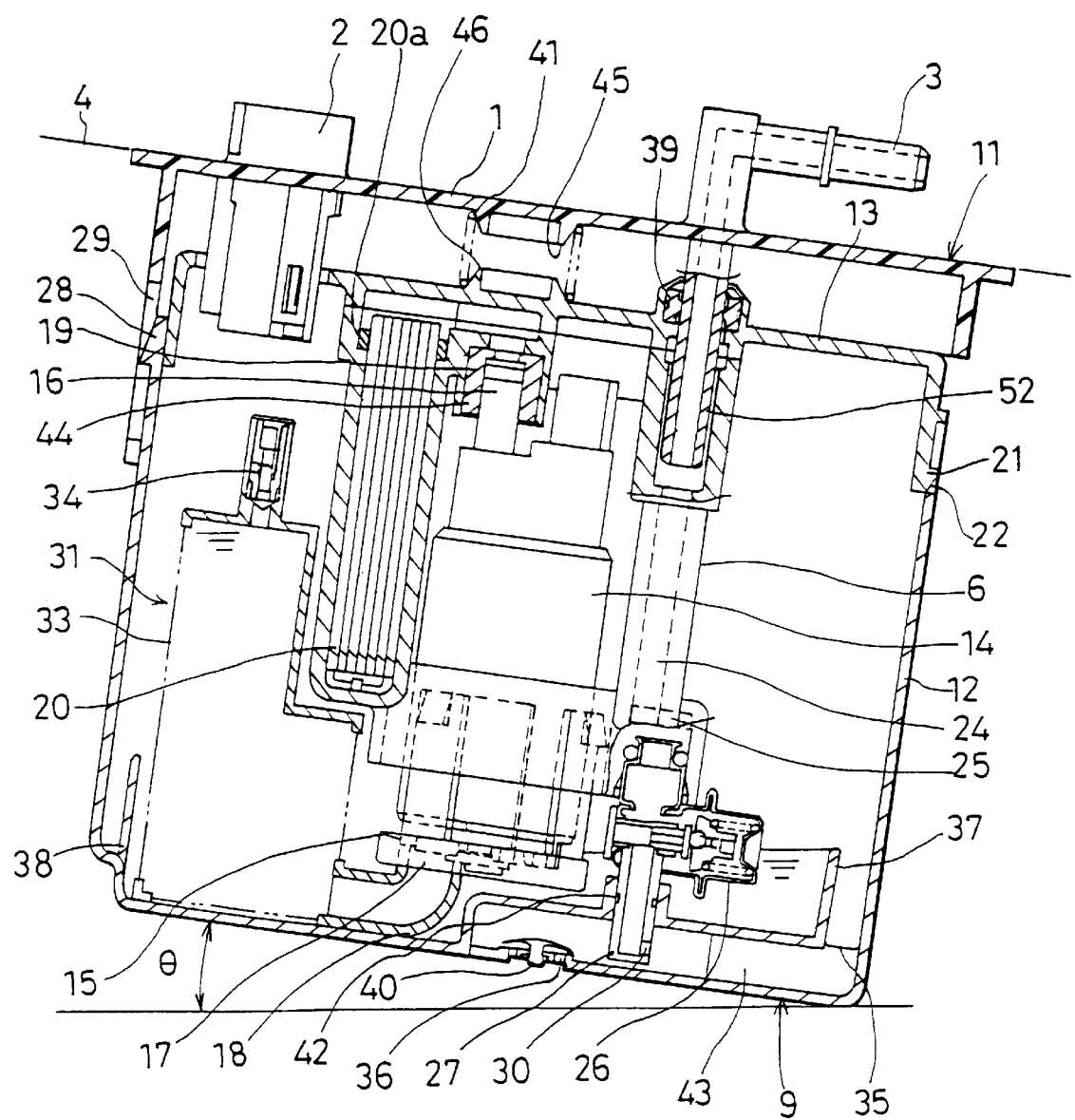

In the fifth embodiment, the fuel supply unit 11 shown in FIGS. 8 and 9 is suspended in the fuel tank (not shown) from the upper tank 4 of the fuel tank.

The flange 1 is made of an insulating resin and is attached to the opening of the upper tank 4 made of a metal constructing the fuel tank. In the flange 1, the electric connector 2 for receiving electricity in which a plurality of terminal pins for supplying electricity to the fuel pump 14 are inserted and the supply pipe 3 for supplying the fuel to the engine side are formed in the insulating resin. The sub-tank 9 is provided inside the fuel tank of the flange 1.

The sub-tank 9 is made of a conductive resin and has the sub-tank body 12 and the sub-tank lid member 13 for covering the upper opening of the sub-tank body 12. The sub-tank lid member 13 has the filter housing 6 in the sub-tank 9.

The sub-tank body 12 and the sub-tank lid member 13 of the sub-tank 9 are made of a conductive resin including carbon. It is desirable that POM including carbon or POM is used for the sub-tank 9. Since the sub-tank body 12 and the sub-tank lid member 13 made of the resin including carbon have sufficiently large surface, electric charges to be accumulated on the filter element 20 when the fuel passes the filter element 20 are easily dissipated to the outside through the sub-tank body 12 and the sub-tank lid member 13. The electricity is easily conducted from the sub-tank 9 to the outside through the fuel. Therefore, static electricity does not easily generate in the filter housing 6. The filter housing 6 is fixed to the sub-tank lid member 13 by hot plate welding. The other constructions are the substantially same as those of the first embodiment.

In the embodiment, when the fuel pump 14 is operated and the fuel flows in the filter element 20, static electricity is generated by friction. Since the filter housing 6, the sub-tank body 12, and the sub-tank lid member 13 are made of the conductive resin, the static electricity can be dissipated without being accumulated in the sub-tank 9. When the sub-tank is non-conductive, the static electricity is accumulated in the sub-tank and there is such a problem that a hole is opened in the filter case or the sub-tank due to an electric discharge.

In the case where the filter case is made of a metal, the following disadvantages will be encountered. (1) if there is a grounding connection, the production costs are increased and a lead wire for grounding is necessary, so that wiring costs are also increased. (2) If there is no grounding connection, the static electricity is accumulated on the surface of the filter case surrounded by the sub-tank 9 made of the non-conductive resin, so that the sub-tank 9 itself has a high charge level. Consequently, sparks undesirably occur due to deformation of the sub-tank 9 or the like and a hole may be opened in the fuel tank or the sub-tank 9.

On the contrary, according to the embodiment, since the filter housing 6, the sub-tank body 12, and the sub-tank lid member 13 are made of the conductive resin, the static electricity is not easily generated in the sub-tank 9.

Although the case in which the sub-tank body 12 and the sub-tank lid member 13 are made of the conductive resin has been described in the embodiment, all or a part of the sub-tank body 12 can be made of an insulating resin and all or a part of the sub-tank lid member 13 can be made of a conductive resin. Particularly, since the surface of the sub-tank lid member 13 can be reduced, it is advantageous from the viewpoint of production that only the sub-tank lid member 13 is made of the conductive resin. Since the filter housing is attached to the sub-tank lid member by the welding, it is convenient that the static electricity can be easily dissipated even when only the sub-tank lid member is made of the conductive resin.

What is claimed is:

1. A fuel supply system comprising:

a fuel tank for storing fuel;

a sub-tank provided in the fuel tank and having a fuel intake port for taking the fuel from a lower part of the fuel tank to an inside thereof;

a suction filter provided in the sub-tank;

a fuel pump provided in the sub-tank to pump the fuel in the sub-tank from a suction opening side thereof through the suction filter;

a flange for fixing the sub-tank to the fuel tank; and a fuel level holding member formed to rise on the suction opening side of the fuel pump for accumulating the fuel in a space defined by a rising part thereof.

2. A fuel supply system according to claim 1, wherein:

the fuel intake port is provided on a bottom of the sub-tank;

the suction filter is disposed to reserve therein the fuel accumulated in the fuel level holding member; and the sub-tank has a check valve and a passage formed by a passage wall and communicating the fuel intake port to the inside.

3. A fuel supply system according to claim 1, further comprising:

a fuel filter provided around the fuel pump;

a filter housing housing the fuel filter and connected to the sub-tank;

a lid member provided on the flange for the sub-tank;

a return pipe supported by the flange for discharging the fuel therethrough to the sub-tank; and a sliding seal part provided in the lid member and slidably fit with the return pipe.

4. A fuel supply system according to claim 1, wherein:

the fuel pump has a branch part for branching the fuel to a fuel supply side and to a return side; and a jet pump is provided on the return side of the branch part.

5. A fuel supply system according to claim 1, further comprising:

a fuel filter provided around the fuel pump;

a filter housing housing the fuel filter and connected to the sub-tank;

a spring for adjusting a distance between the flange and the sub-tank in accordance with a depth of the fuel tank between a body of the sub-tank and the lid member; and a spring receiving part formed on the flange and protruding toward the lid member.

6. A fuel supply system comprising:

a fuel tank;

a sub-tank provided in a bottom of the fuel tank and having at a bottom thereof a communicating space for introducing fuel from an outside thereof to an inside thereof;

a fuel accumulating chamber formed in the sub-tank;

a fuel pump for pumping and pressurizing the fuel from the fuel accumulating chamber;

a suction filter having a part housed in the fuel accumulating chamber for removing foreign material entering the fuel pump;

a jet pump for transferring the fuel from the outside of the sub-tank to the fuel accumulating chamber by using a fluid energy of a part of the fuel discharged from the fuel pump;

a suction passage for passing the fuel sucked by the jet pump;

a partition wall part formed in a gravity direction and partitions the fuel accumulating chamber and the suction passage; and the suction filter having an outer peripheral surface covered by a mesh to provide a closed space therein by a fuel oil film formed on the mesh.

7. A fuel supply system according to claim 6, wherein:

the closed space has a predetermined volume sufficient for a run until the fuel stagnating in a corner of the fuel tank is returned to the communicating space.

8. A fuel supply system according to claim 7, wherein:

the predetermined volume is more than about 100 cc.

9. A fuel supply system according to claim 6, wherein:

the fuel accumulating chamber is defined by a labyrinth wall protruding upward for preventing outflow of the fuel;

the partition wall part is formed along a periphery of the sub-tank; and the suction filter is surrounded by the labyrinth wall and the partition wall part.

10. A fuel supply system according to claim 6, further comprising:

a flange supported in an attachment opening of the fuel tank to suspend the sub-tank therefrom.

11. A fuel supply system according to claim 10, wherein:

the suction filter has a vertical dimension larger than a lateral dimension.

12. A fuel supply system according to claim 6, wherein:

the mesh of the suction filter is a weave type having openings each of which is about 30 $\mu$m.

* * * * *